_United States Patent_ [19]

Olmsted et al.

[11] Patent Number: 5,161,737
[45] Date of Patent: Nov. 10, 1992

[54] TEMPERATURE CONTROL FLOW VALVE

[75] Inventors: Richard W. Olmsted, Londonderry, N.H.; Stephen C. Gonyaw, Concord, Vt.

[73] Assignee: Watts Regulator Company, No. Andover, Mass.

[21] Appl. No.: 755,657

[22] Filed: Sep. 6, 1991

[51] Int. Cl.[5] ............................................. G05D 23/13
[52] U.S. Cl. ................................. 236/12.21; 137/114
[58] Field of Search ...................... 236/12.21, 12.23; 137/98, 114

[56] References Cited

U.S. PATENT DOCUMENTS

| | | | |
|---|---|---|---|
| 1,877,510 | 9/1932 | Hughes | 236/93 B |
| 2,214,375 | 9/1940 | Jackson | 137/139 |
| 3,032,058 | 5/1962 | Weese | 137/468 |
| 3,116,748 | 1/1964 | Wasson | 137/98 |
| 3,436,017 | 5/1967 | Elmer | 236/92 |
| 3,921,659 | 11/1975 | Rudewick, III | 137/98 |
| 3,938,741 | 2/1976 | Allison | 239/75 |
| 4,210,284 | 7/1980 | Tarnay et al. | 239/75 |
| 4,563,780 | 1/1986 | Pollack | 4/192 |
| 4,778,104 | 10/1988 | Fisher | 236/80 |
| 4,896,658 | 1/1990 | Yonekubo et al. | 236/12.21 X |
| 4,896,691 | 1/1990 | Green et al. | 137/114 X |
| 4,905,732 | 3/1990 | Bright et al. | 137/605 |
| 4,915,295 | 4/1990 | Pullen et al. | 236/12.16 |

_Primary Examiner_—Willaim E. Tapolcai

[57] ABSTRACT

A temperature control flow valve has a body defining conduits for connection to sources of cold and hot water, a chamber for mixing the water, and a thermostat element for maintaining the temperature of the mixed water at or below a predetermined maximum temperature. The cold and hot water are combined through a mixing valve in a ratio (adjusted continuously by means of the thermostat element) to provide the mixed water at the predetermined temperature. The flow valve includes cold water and hot water pressure regulators, the hot water regulator being responsive to the pressure of the cold water to maintain the pressure of the hot water delivered through the regulator substantially equal to the pressure of the cold water.

10 Claims, 3 Drawing Sheets

5,161,737

TEMPERATURE CONTROL FLOW VALVE

BACKGROUND OF THE INVENTION

This invention relates to fluid flow control valves, and in particular to valves adapted to maintain the temperature of fluid delivered through the valve below a predetermined maximum level.

Temperature control or anti-scald valves are employed for regulating the temperature of water delivered to a faucet or the like, e.g., in a facility such as a nursing home, school or hotel, to ensure that the water is at or below a predetermined maximum temperature to reduce the potential for injury. The anti-scald valve may be connected to the hot and cold water supply lines to regulate flow in order to provide a temperature-controlled mixture.

SUMMARY OF THE INVENTION

According to one aspect of the invention, a temperature control flow valve comprises a body defining a first conduit having a cold water inlet adapted for attachment to a source of cold water, a second conduit having a hot water inlet adapted for attachment to a source of hot water, and at least a first mixing chamber. The first conduit has a cold water outlet for flow of cold water into the first mixing chamber, and the second conduit has a hot water outlet for flow of hot water into the first mixing chamber. The body further defines a mixed water outlet adapted for attachment to a conduit system for delivery of mixed water to one or more points of use. The valve further comprises a cold water pressure regulator adapted to control the pressure of cold water flowing toward the cold water outlet, the cold water pressure regulator comprising a cold water valve element disposed for movement relative to an opposed cold water valve seat in a manner to regulate the flow of cold water through a cold water valve opening, means for maintaining the pressure of cold water flowing toward the cold water outlet below a predetermined maximum pressure, a hot water pressure regulator adapted to control the pressure of hot water flowing toward the hot water outlet, the hot water pressure regulator comprising a hot water valve element disposed for movement relative to an opposed hot water valve seat in a manner to regulate the flow of hot water through a hot water valve opening, means for maintaining the pressure of hot water flowing toward the hot water outlet substantially equal to the pressure of cold water flowing toward the cold water outlet, a mixing valve assembly comprising a mixing valve element disposed in the first mixing chamber, the mixing valve element adapted for movement within the first mixing chamber in a manner to adjust the ratio of hot water and cold water flowing into the first mixing chamber, and a thermostat element connected with the mixing valve element, the thermostat element adapted to react to change of temperature of the mixed water in a manner to adjust the position of the mixing valve element in the first mixing chamber, thereby to maintain the temperature of mixed water below a predetermined maximum temperature.

Preferred embodiments of this aspect of the invention may include one or more of the following additional features. The body further defines a second mixing chamber and at least a third conduit connecting the first mixing chamber and the second mixing chamber, the outlet being connected to the second mixing chamber and the thermostat element being disposed in the second mixing chamber. Preferably, the body defines one or more additional conduits also connecting the first mixing chamber and the second mixing chamber. The body further defines a further cold water outlet adapted for attachment to a conduit system for delivery of cold water to one or more points of use. The means for maintaining the pressure of hot water flowing toward the hot water outlet substantially equal to the pressure of cold water flowing toward the cold water outlet comprises a diaphragm disposed in a chamber defined by the body, a first surface of the diaphragm in contact with the cold water conduit, and a second, opposite surface of the diaphragm in contact with the hot water conduit, and means connecting the diaphragm with the hot water valve element, the diaphragm being adapted to move in reaction to variation in a ratio of pressure in the cold water conduit to pressure in the hot water conduit, movement of the diaphragm resulting in movement of the hot water valve element relative to the hot water valve seat. The mixing valve assembly further comprises a first mixing valve seat, and a second mixing valve seat, and the mixing valve element disposed in the first mixing chamber comprises a first mixing valve member opposed to and disposed for engagement upon the first mixing valve seat and a second mixing valve member opposed to and disposed for engagement upon the second mixing valve seat, and the first mixing valve member and the opposed first mixing valve seat together defining a cold water flow orifice and the second mixing valve member and the opposed second mixing valve seat defining a hot water flow orifice. The thermostat element comprises at least one cell containing a material adapted to change volume in reaction to change of temperature, preferably the material comprises wax containing heat conducting particles and the thermostat element comprises a redundancy of the chambers.

According to another aspect of the invention, a pressure control flow valve comprises a body defining a first conduit having a cold water inlet adapted for attachment to a source of cold water and a cold water outlet, a second conduit having a hot water inlet adapted for attachment to a source of hot water and a hot water outlet, a cold water pressure regulator adapted to control the pressure of cold water flowing toward the cold water outlet, the cold water pressure regulator comprising a cold water valve element disposed for movement relative to an opposed cold water valve seat in a manner to regulate the flow of cold water through a cold water valve opening, means for maintaining the pressure of cold water flowing toward the cold water outlet below a predetermined maximum pressure, a hot water pressure regulator adapted to control the pressure of hot water flowing toward the hot water outlet, the hot water pressure regulator comprising a hot water valve element disposed for movement relative to an opposed hot water valve seat in a manner to regulate the flow of hot water through a hot water valve opening, means for maintaining the pressure of hot water flowing toward the hot water outlet substantially equal to the pressure of cold water flowing toward the cold water outlet, the means for maintaining the pressure of hot water flowing toward the hot water outlet substantially equal to the pressure of cold water flowing toward the cold water outlet comprising a diaphragm disposed in a chamber defined by the body, a first surface of the diaphragm in contact with the cold water conduit, and a second, opposite surface of the diaphragm in contact with the hot water conduit, and means connecting the diaphragm with the hot water valve element, the diaphragm adapted to move in reaction to variation in a ratio of pressure in the cold water conduit to pressure in the hot water conduit, movement of the diaphragm resulting in movement of the hot water valve element relative to the hot water valve seat, whereby the pressure of cold water delivered at the cold water outlet and the pressure of hot water delivered at the hot water outlet are substantially equal.

Thus there is provided a temperature control flow valve adapted for installation adjacent a source of hot water, e.g. at the hot water heater in a home or in a complex of apartments, for delivery of mixed (hot) water at a predetermined maximum temperature[1] to all of the points of use within the facility to be served. Furthermore, if flow of cold water to the valve is interrupted, the valve will cease all flow to prevent unmixed hot water at a temperature above the predetermined maximum from reaching the point of use. In an alternate embodiment, cold water flow to mixing valves at the points of use is also delivered through the valve of the invention, so that loss of the source of cold water flow required for lowering the temperature of water at the point of use will result in discontinuation of flow of the mixed (hot) water as well. Finally, the valve of the invention also provides the cold water and the hot water at substantially equal pressure.

The temperature of the mixed water will, of course, fall below the predetermined maximum temperature if the temperature of water from the hot water source is below the expected level.

Other features, objects, and advantages of the invention will become apparent from the following detailed description of a presently preferred embodiment, and from the claims.

DESCRIPTION OF THE ILLUSTRATED EMBODIMENT

Figure 1:
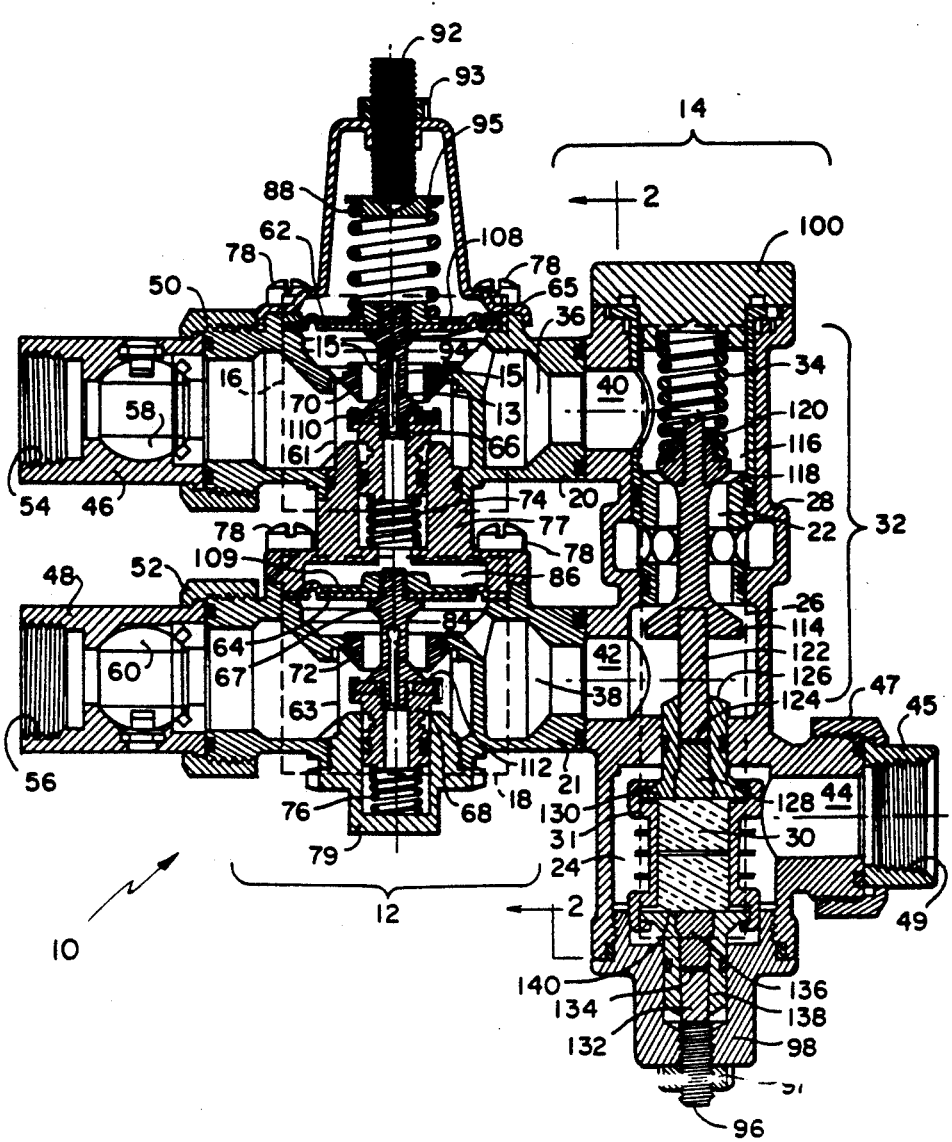
FIG. 1 is a top plan view, taken in section, of an anti-scald valve according to the invention.

Referring now to FIG. 1, an anti-scald valve 10 of the invention generally includes a pressure regulator section 12 and a thermostatic tempering valve section 14.

The pressure regulator section 12 includes a cold water hydraulic pressure reduction valve or pressure regulator 16 for regulation of cold water pressure and a hot water hydraulic pressure reduction valve or pressure regulator 18 for control of hot water hydraulic pressure. Valves 16 and 18 (indicated by dotted-line boxes 16, 18) are housed in regulator bodies 20 and 21, respectively.

Thermostatic tempering valve section 14 defines first mixing chamber 22 and second mixing chamber 24, and a mixing valve assembly 26 housed in a mixing valve body 28. Mixing valve assembly 26 (identified generally by the labelled dotted-line box) generally includes a dual-element, wax-filled thermostat element 30 housed in a thermostat body 31, a piston assembly 32, and a return spring 34.

Pressure reduction valves 16 and 18 act to constantly provide cold and hot water of equal pressure at outlets 36 and 38 of regulator bodies 20 and 21, respectively. The pressure-balanced flows of cold water and hot water then flow into mixing valve body 28 by way of respective inlets 40 and 42, where the flows are mixed in a ratio that is adjusted in order that a mixed water temperature no higher than a predetermined maximum level is provided at a mixed water outlet 44 of mixing valve body 28.

The regulator bodies 20 and 21 are connected to cold water and hot water supplies through threaded fittings 46 and 48 which are joined to regulator bodies 20 and 21, e.g., by threaded union nuts 50 and 52, respectively. Fittings 46 and 48 define female threaded openings 54 and 56 sized for attachment upon ¾ inch (1.905 cm) externally threaded cold water and hot water supply lines. The fittings may also include ball valves 58 and 60 to permit the supply water flow to be stopped, e.g. to permit repair or replacement of downstream plumbing elements, including the anti-scald valve.

The pressure regulators 16 and 18 respectively include pressure plates 108 and 109, diaphragms 62 and 64, discs 110 and 112, disc holders 66 and 68, valve stems 65 and 67, disc seats 70 and 72, and return springs 74 and 76. A cage 77, which is inserted into regulator body 20 and secured to regulator body 21 by screws 78 during assembly, is disposed between regulator bodies 20 and 21 and defines a cavity for return spring 74 and an upper chamber 86. Screws 78 also secure a spring cage 90 (described below) to regulator body 20. Screws 78 allow the regulator bodies to be replaced or repaired as needed. A bottom plug 79 threaded into regulator body 21 provides access to return spring 76 of regulator 18.

The pressure of the cold water delivered at outlet 36 and the pressure of the hot water delivered at outlet 38 are kept balanced (i.e., equal) by action of the pressure regulators 16 and 18, as will now be described.

The maximum pressure of cold water supply is set by means of a pressure setting assembly consisting of adjusting screw 92 extending through adjusting nut 93 mounted upon spring cage 90. An adjustable actuating spring 88 housed in spring cage 90 is held under compression between a spring washer 95 mounted at the end of the adjusting screw 92 and pressure plate 108 disposed at one surface of diaphragm 62, the opposite surface of the diaphragm being disposed in contact with the cold water supply.

Valve disc 110 is mounted about disc holder 66, the valve disc 110 being disposed for engagement with disc seat 70 mounted on the regulator body 20, the valve disc being biased toward engagement by compressed spring 74 acting upon the disc holder. One end of valve stem 65 extends through diaphragm 62 and connects with pressure plate 108 while the opposite end connects with disc holder 66. Thus, movement of valve stem 65 results in movement of the diaphragm. The pressure of cold water supplied to outlet 36 is controlled by action of diaphragm 62, as will now be described.

If cold water supply pressure exceeds the desired predetermined level, the water pressure acts to deflect the diaphragm thereby causing the disc holder and thus the valve stem to move upward (due in part also to action by spring 74) to bring the valve disc closer to the disc seat and reducing the flow opening therebetween. Conversely, lower cold water supply pressure causes the spring 88 to act against the force of spring 74 to deflect the valve stem and thus the disc holder downward, thus increasing the flow opening between the valve disc and the disc seat for increased cold water flow.

A portion of the total volume of cold water flows into inlet 15 and down through passage 13, to chamber 86. The water thus delivered to chamber 86 is at the same pressure as the cold water delivered through the flow passage to outlet 36.

The hot water pressure regulator 18 is a slave to cold water pressure regulator 16, and the regulators together act to maintain the hot water and cold water at the outlets 36, 38 at approximately the same pressure.

The hot water pressure regulator 18 consists of disc holder 68 upon which is mounted a valve disc 112 disposed in opposition to disc seat 72 mounted upon the regulator body 21, the hot water flow opening being defined therebetween. Valve stem 67 at its upper end extends through diaphragm 64 and connects to pressure plate 109, the diaphragm and pressure plate being disposed between upper chamber 86 (cold water supply) and a lower chamber 84 (hot water supply). The valve stem is urged upwardly by spring 76 disposed under compression. The position of disc holder 68 and valve stem 67, and thus the position of valve disc 112 relative to disc seat 72, is controlled by the cold water pressure, as will now be described.

By way of example, when the water pressure of the cold water supply to fitting 46 is relatively low so that the cold water pressure in the upper chamber 86 (and at the cold water outlet 36) is less than the hot water pressure in the lower chamber 84 (and also at the outlet 38), diaphragm 64 is deflected upwardly. As a result, valve disc 112 is brought closer to disc seat 72 to reduce the volume of hot water allowed to flow through regulator 18. The hot water pressure at outlet 38 is reduced to approximately that of the cold water flow.

If the pressure of the cold water supply increases so that the cold water pressure at outlet 36 is greater than the hot water pressure at outlet 38, diaphragm 64 is deflected downwardly to cause valve disc 112 to be moved away from disc seat 72. Thus, more hot water is allowed to flow through regulator 18 and the hot water pressure at outlet 38 is increased to match approximately the pressure of the cold water supply.

Finally, if the pressure of the cold water supply line drops to zero, i.e., if supply is lost and the cold water pressure at outlet 36 is also zero, diaphragm 64 moves upwardly and causes valve disc 112 to be brought into sealing contact with disc seat 72. That is, no hot water is allowed to flow through regulator 18 and the hot water pressure at outlet 38 is reduced to zero. Thus, when the cold water supply is lost, hot water flow is prevented from reaching the faucet, for example.

This pressure balancing feature of anti-scald valve 10 of the invention maintains the cold water pressure at outlet 36 and the hot water pressure at outlet 38 at approximately the same level.

The pressure-balanced flows of cold water and hot water exiting the pressure regulator section 12 via outlets 36 and 38 enter the thermostatic tempering valve section 14 via inlets 40 and 42 of mixing valve body 28 and flow into first mixing chamber 22. The respective volumes of cold water and hot water entering the first mixing chamber 22 are also controlled, as will now be described.

Figure 2:
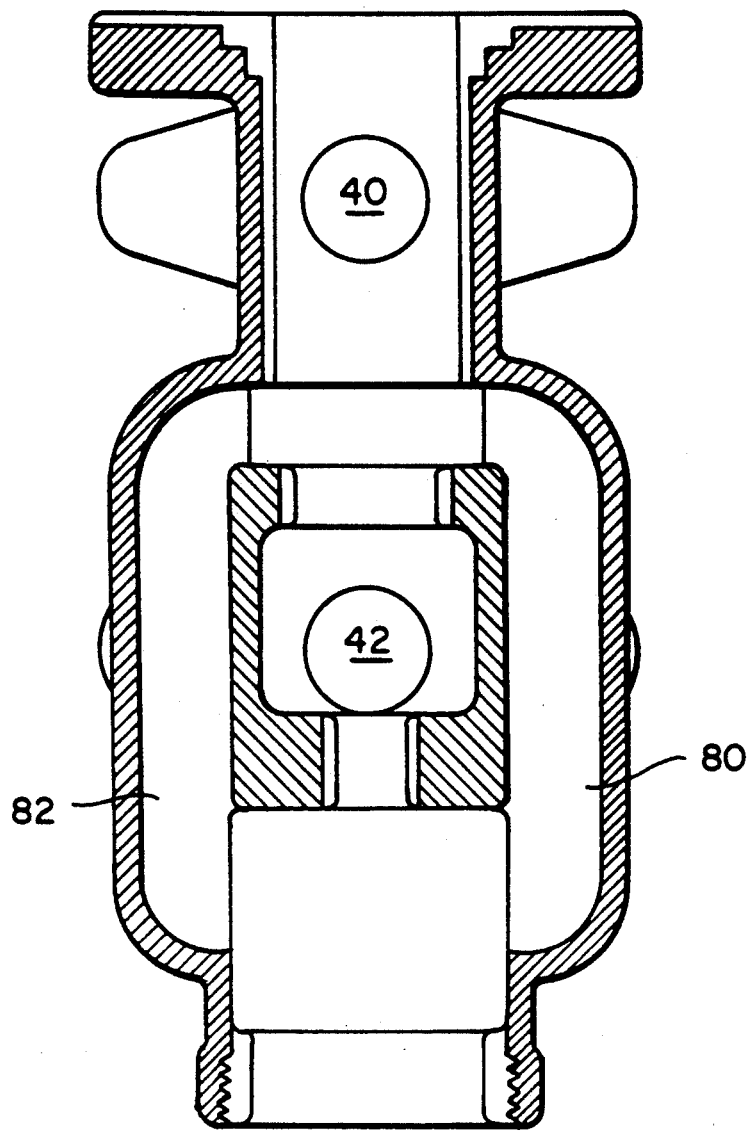
FIG. 2 is a side section of the anti-scald valve of the invention taken at the line 2—2 of FIG. 1.

The respective volumes of cold water and hot water passing through the regulators 16, 18 enter mixing chamber 22 defined by mixing valve body 28. The, volume ratio of cold water to hot water entering the first mixing chamber is determined by the position of piston assembly 32, which is controlled and adjusted continuously by the action of thermostat 30. The first mixing chamber 22 is connected by jug handle conduits 80, 82 (FIG. 2), defined by mixing valve body 28, to second mixing chamber 24 within which thermostat 30 is located. The jug handle conduits 80, 82 promote turbulent flow of the water mixture about thermostat 30 to provide efficient exchange of heat between the thermostat 30 and the water in the surrounding second mixing chamber.

Second mixing chamber 24 is connected to mixed water outlet 44 defined by mixing valve body 28. A threaded fitting 45 is joined to the mixing valve body at outlet 44, e.g., by a threaded union nut 47. Fitting 45 defines a female threaded openings 49 sized to receive a ¾ inch (1.905 cm) externally threaded mixed water line.

Piston assembly 32 includes a plug stem 114 with an attached seat button 116 disposed for engagement with a seat/cage 118 mounted in the mixing valve body 28, the seat button 116 being biased towards engagement by return spring 34 (which may be accessed by removal of a top cap 100). An adjusting nut 120 secures seat button 116 to plug stem 114. Piston assembly 32 further includes a plunger 122 connected to plug stem 114 at a first end and contacting a diaphragm 124 at a second end, the diaphragm 124 and a portion of the second end of the plunger being disposed inside a bonnet 126 mounted to the thermostat body 31.

A buffer element 128 also disposed inside the bonnet 126 is located between an upper diaphragm 130 of the thermostat 30 and diaphragm 124 and acts to transfer movement of upper diaphragm 130 to plunger 122 and thus plug stem 114.

Thermostat 30 is a dual-element, wax-filled actuator. Thermostat body 31 is made of copper. The wax filling, which has a melting point of approximately 104° Fahrenheit (about 40° Celsius), is a mixture of wax with fine copper particles (the copper particles serving to increase thermal conductivity of the mixture) that expands as the temperature increases. Expansion of the wax filling causes upward movement of upper diaphragm 130, which in turn causes upward movement of plunger 122 and plug stem 114. The dual thermostat elements provide redundancy for safety and reliability.

A temperature adjusting mechanism, including a set screw 96 and lock nut 97, is provided to allow a desired mixed water temperature level to be set, typically with the hot water supply at a particular temperature. The set screw 96 extends through a bottom cap 98 threaded into the bottom end of mixing valve body 28. Set screw 96 contacts a plunger 132, which in turn bears upon a diaphragm 134 and then a buffer 136. Plunger 132, diaphragm 134, and buffer 136 are disposed inside a bonnet 138 mounted to the thermostat body 31. A lower diaphragm 140 separates the buffer 136 from the wax filling of the thermostat 30.

The volumes of cold water and hot water allowed into first mixing chamber 22 depend on the position of piston assembly 32 (i.e., plug stem 114). The position of the plug stem can range from one extreme where mostly cold water is allowed into first mixing chamber 22 to the other extreme where mostly hot water is allowed into first mixing chamber 22. A tight, metal-to metal seal between the plug stem and the seat/cage 118 prevents hot water from entering mixing chamber 22 when the plug stem is in the position that only allows cold water into first mixing chamber 22. Similarly, a tight, durable metal-to-metal seal between the seat button 116 and the seat/cage prevents cold water from entering mixing chamber 22 when the plug, stem is in the position that only allows hot water into first mixing chamber 22.

When the piston assembly 32 (i.e., plug stem 114) is disposed between its two extreme positions, a mix of cold water and hot water is allowed into first mixing chamber 22.

Water in first mixing chamber 22 travels through two jug handles 80 and 82 (shown in FIG. 2) and enters second mixing chamber 24 where thermostat 30 is located. As previously stated, jug handles 80 and 82 promote turbulent flow of water in second mixing chamber 24 which results in the efficient exchange of heat from the water to thermostat 30. Efficient heat exchange is necessary to assure an accurate reading by thermostat 30, and thus the proper ratio of cold water and hot water in first mixing chamber 22. Note that thermostat 30 controls the movement of piston assembly 32 and therefore the mix of cold water and hot water that enters first mixing chamber 22.

By way of example, when the temperature of the water in second mixing chamber 24 is above the predetermined level, thermostat 30 expands to cause the piston assembly to move upwardly against the force of return spring 34, thereby moving the plug stem to decrease the volume of hot water permitted to flow into first mixing chamber 22 and increasing the volume of cold water permitted to flow into the chamber. Conversely, when the temperature of the water entering in second mixing chamber 24 is lower than the predetermined level, thermostat 30 contracts to allow the return spring 34 to move the piston assembly in a downwardly direction so that the volume flow rate of hot water permitted to enter the second mixing chamber 24 is increased and the volume flow rate of cold water entering is decreased.

Thus, the action of mixing valve assembly 26 results in delivery of water at outlet 44 that is at the desired temperature. Of course, the mixed water temperature could fall below the desired maximum temperature, if the temperature of the hot water supply is below the desired mixed water maximum temperature level.

A supply line for delivery of the mixed water throughout the home or facility is then attached to externally screw threaded mixed water outlet 44.

The mixing valve assembly 26 is designed to operate properly with a flow of 2 gallons per minute (about 7.6 liters per minute or about 0.126 liters per second) or greater. Thus the flow of mixed water from outlet 44 more than meets existing requirements for minimum flow due to the adequate flow provided by the ¾ inch (1.905 cm) cold water and hot water supply lines.

Other embodiments are within the following claims. For example, dual temperature sensitive elements are not necessary for proper operation, and a single element or more than two elements could also be employed. Anti-scald valve 10 may also include a "tamper-proof" temperature adjusting mechanism (not shown). To provide the tamper-proof feature, a protective housing may be secured over the temperature adjusting mechanism. The protective housing may be affixed to either bottom cap 98, or to mixing valve body 28, in a manner such that it may be removed only by an authorized technician to gain access to the temperature adjusting mechanism. Strainers 61 and 63 (FIG. 1) may also be provided in the paths of the cold and hot water flows, respectively, to prevent potentially harmful particles from entering regulators 16 and 18.

Also, for many "point of use" applications within a home or the like, e.g., at a shower or a sink, it is desireable to permit adjustment (lowering) of the temperature of the water delivered at the nozzle or faucet from the maximum temperature provided by operation of the anti-scald valve 10. This requires both a hot water supply line (delivered from the anti-scald valve) and a cold water supply line (for tempering the maximum hot water temperature). According to one embodiment of the invention, the mixed water outlet 44 of anti-scald valve 10 provides the hot water supply and the cold water supply may be obtained by tapping off the cold water inlet line, e.g. feeding to inlet 54. A person at the point of use then operates a manual mixing valve to combine the hot (i.e., mixed) water supply with the cold water supply to achieve a desired water temperature.

In such an arrangement, the cold water supply feeding the point of use may have a decrease or loss in pressure that does not also result in a similar decrease in pressure of the cold water supply attached to fitting 46 of anti-scald valve 10. The anti-scald valve 10 of the invention can only compensate for pressure changes in the supply lines attached to fittings 46 and 48, and this situation may result in higher than desirable temperatures at the point of use (e.g., the shower head or sink faucet), since the hot water delivered to the point of use from the anti-scald valve will remain at approximately the same predetermined maximum temperature, and the flow of cold water, required for adjustment (lowering) of the temperature of the hot water, has decreased or even ceased. (The temperature of the water at the point of use will, of course, never exceed the predetermined maximum level provided at mixed water outlet 44.)

Figure 3:
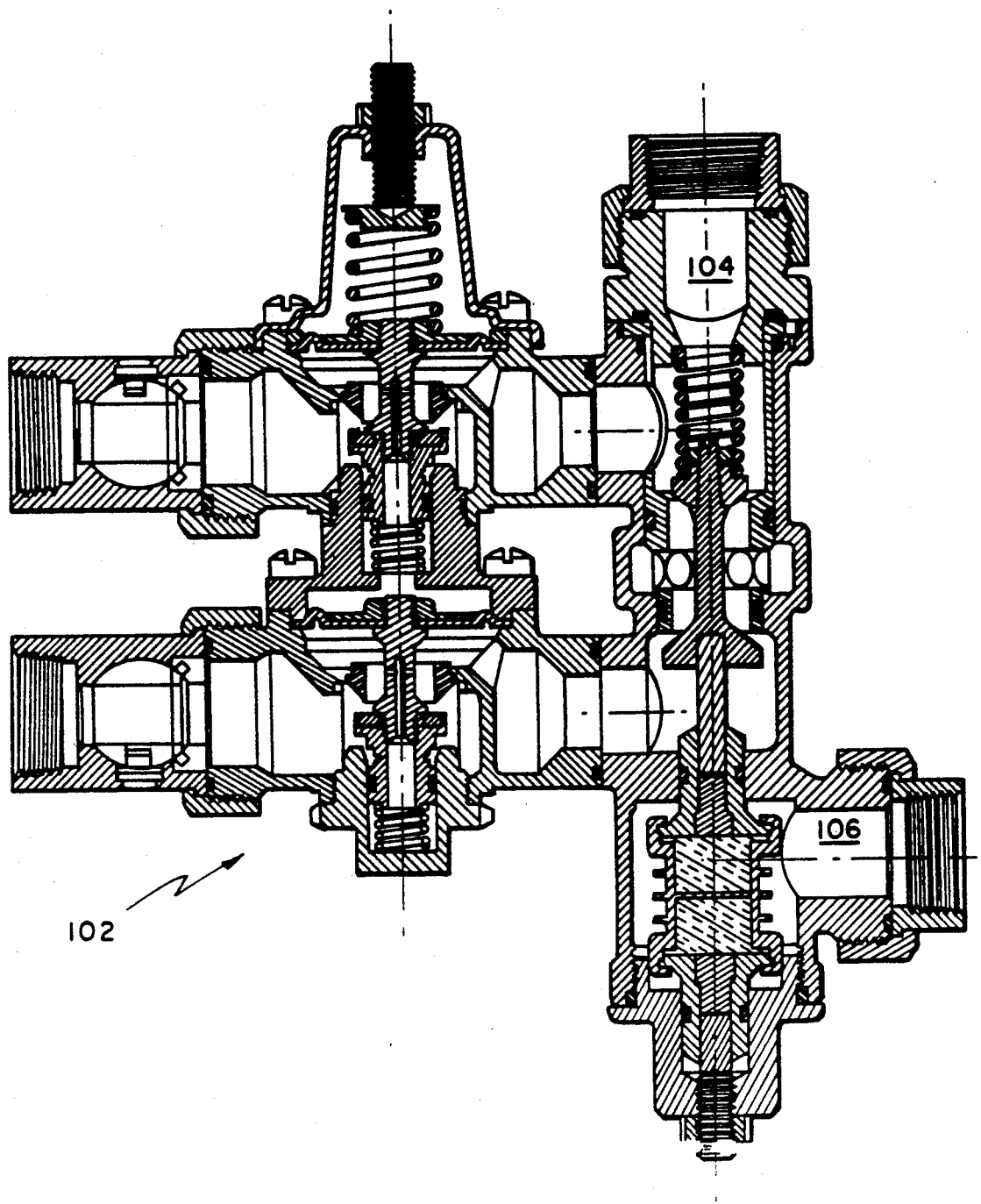
FIG. 3 is a top plan view, taken in section, of an alternate embodiment of an anti-scald valve according to the invention.

Referring to FIG. 3, according to an alternate embodiment of the invention, in order to prevent the temperature of the water at the point of use from exceeding the desired temperature, an anti-scald valve 102 of the invention includes a cold water outlet fitting 104 (in addition to a mixed water outlet 106). This alternate embodiment is similar to that of FIG. 1, except that both the cold water supplied to the point of use, and the facility in general (flowing via fitting 104), and the hot water supply for the point of use, and the facility in general (flowing via fitting 106) are provided through the anti-scald valve 102. Thus by means of the alternate embodiment of the anti-scald valve of the invention, any loss of pressure of the cold water supply feeding the point of use must reflect a similar loss of pressure in the cold water line attached to fitting 46. Therefore, due to the safety features of the anti-scald valve of the invention, flow of the hot (mixed) water to the point of use, without flow of cold water for tempering, will be prevented.

What is claimed is:

1. A temperature control flow valve comprising
   a body;
   said body defining
   a first conduit having a cold water inlet adapted for attachment to a source of cold water,
   a second conduit having a hot water inlet adapted for attachment to a source of hot water,
   at least a first mixing chamber, said first conduit having a cold water outlet for flow of cold water into said first mixing chamber, and said second conduit having a hot water outlet for flow of hot water into said first mixing chamber, and a mixed water outlet adapted for attachment to a conduit system for delivery of mixed water to one or more points of use, a cold water pressure regulator adapted to control the pressure of cold water flowing toward said cold water outlet, said cold water pressure regulator comprising a cold water valve element disposed for movement relative to an opposed cold water valve seat in a manner to regulate the flow of cold water through a cold water valve opening, means for maintaining the pressure of cold water flowing toward said cold water outlet below a predetermined maximum pressure, a hot water pressure regulator adapted to control the pressure of hot water flowing toward said hot water outlet, said hot water pressure regulator comprising a hot water valve element disposed for movement relative to an opposed hot water valve seat in a manner to regulate the flow of hot water through a hot water valve opening, means for maintaining the pressure of hot water flowing toward said hot water outlet substantially equal to the pressure of cold water flowing toward said cold water outlet, a mixing valve assembly comprising a mixing valve element disposed in said first mixing chamber, said mixing valve element adapted for movement within said first mixing chamber in a manner to adjust the ratio of hot water and cold water flowing into said first mixing chamber, and a thermostat element connected with said mixing valve element, said thermostat element adapted to react to change of temperature of the mixed water in a manner to adjust the position of said mixing valve element in said first mixing chamber, thereby to maintain the temperature of mixed water below a predetermined maximum temperature.

2. The temperature control flow valve of claim 1 wherein said body further defines a second mixing chamber and at least a third conduit connecting said first mixing chamber and said second mixing chamber, said outlet being connected to said second mixing chamber and said thermostat element being disposed in said second mixing chamber.

3. The temperature control flow valve of claim 2 wherein said body defines one or more additional conduits also connecting said first mixing chamber and said second mixing chamber.

4. The temperature control flow valve of claim 1 wherein said body further defines a further cold water outlet adapted for attachment to a conduit system for delivery of cold water to one or more points of use.

5. The temperature control flow valve of claim 1 wherein said means for maintaining the pressure of hot water flowing toward said hot water outlet substantially equal to the pressure of cold water flowing toward said cold water outlet comprises a diaphragm disposed in a chamber defined by said body, a first surface of said diaphragm in contact with said cold water conduit, and a second, opposite surface of said diaphragm in contact with said hot water conduit, and means connecting said diaphragm with said hot water valve element, said diaphragm adapted to move in reaction to variation in a ratio of pressure in said cold water conduit to pressure in said hot water conduit, movement of said diaphragm resulting in movement of said hot water valve element relative to said hot water valve seat.

6. The temperature control flow valve of claim 1 wherein said mixing valve assembly further comprises a first mixing valve seat, and a second mixing valve seat, and said mixing valve element disposed in said first mixing chamber comprises a first mixing valve member opposed to and disposed for engagement upon said first mixing valve seat and a second mixing valve member opposed to and disposed for engagement upon said second mixing valve seat, and said first mixing valve member and the opposed first mixing valve seat together defining a cold water flow orifice and said second mixing valve member and the opposed second mixing valve seat defining a hot water flow orifice.

7. The temperature control flow valve of claim 1 wherein said thermostat element comprises at least one cell containing a material adapted to change volume in reaction to change of temperature.

8. The temperature control flow valve of claim 7 wherein said material comprises wax containing heat conducting particles.

9. The temperature control flow valve of claim 7 wherein said thermostat element comprises a redundancy of said chambers.

10. A pressure control flow valve comprising
a body;
said body defining
a first conduit having a cold water inlet adapted for attachment to a source of cold water and a cold water outlet, a second conduit having a hot water inlet adapted for attachment to a source of hot water and a hot water outlet, a cold water pressure regulator adapted to control the pressure of cold water flowing toward said cold water outlet, said cold water pressure regulator comprising a cold water valve element disposed for movement relative to an opposed cold water valve seat in a manner to regulate the flow of cold water through a cold water valve opening, means for maintaining the pressure of cold water flowing toward said cold water outlet below a predetermined maximum pressure, a hot water pressure regulator adapted to control the pressure of hot water flowing toward said hot water outlet, said hot water pressure regulator comprising a hot water valve element disposed for movement relative to an opposed hot water valve seat in a manner to regulate the flow of hot water through a hot water valve opening, means for maintaining the pressure of hot water flowing toward said hot water outlet substantially equal to the pressure of cold water flowing toward said cold water outlet, said mean for maintaining comprising a diaphragm disposed in a chamber defined by said body, a first surface of said diaphragm in contact with said cold water conduit, and a second, opposite surface of said diaphragm in contact with said hot water conduit, and means connecting said diaphragm with said hot water valve element, said diaphragm adapted to move in reaction to variation in a ratio of pressure in said cold water conduit to pressure in said hot water conduit, movement of said diaphragm resulting in movement of said hot water valve element relative to said hot water valve seat, whereby the pressure of cold water delivered at said cold water outlet and the pressure of hot water delivered at said hot water outlet are substantially equal.

* * * * *